R. H. MADSEN.
LAWN MOWER GRINDER.
APPLICATION FILED JULY 22, 1920.
1,398,906.
Patented Nov. 29, 1921.
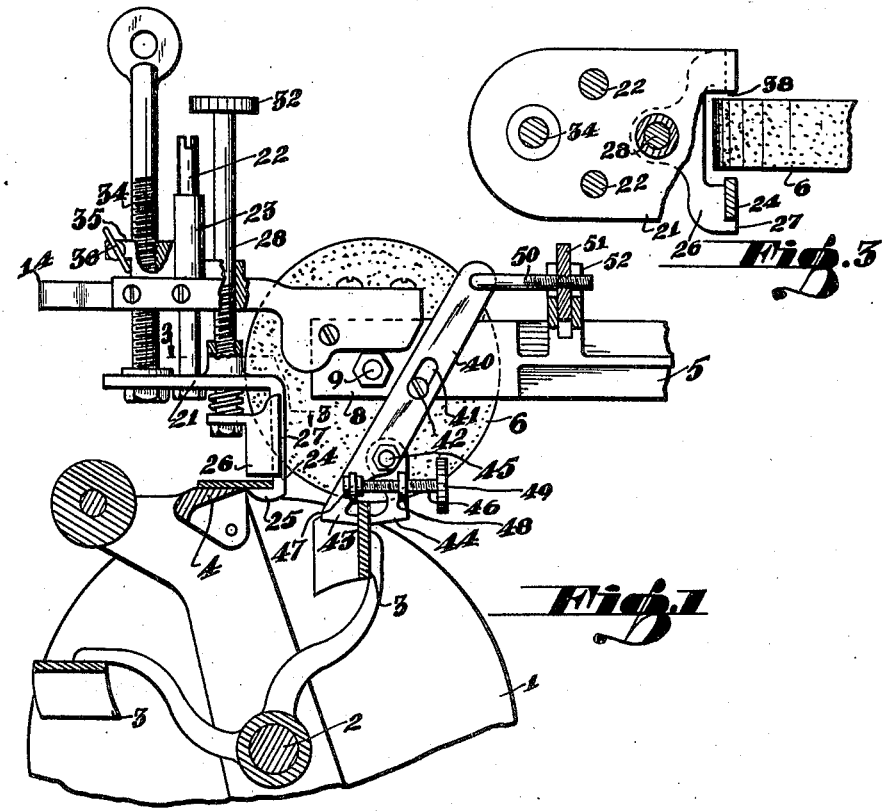
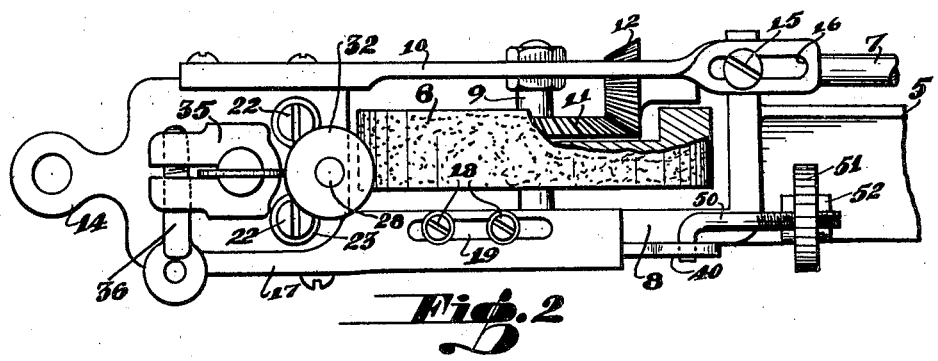
INVENTOR.
R. H. Madsen
BY
Hazard & Miller
ATTORNEYS

UNITED STATES PATENT OFFICE.

RASMUS H. MADSEN, OF LOS ANGELES, CALIFORNIA.

LAWN-MOWER GRINDER.

1,398,906.    Specification of Letters Patent.    Patented Nov. 29, 1921.

Application filed July 22, 1920. Serial No. 398,153.

*To all whom it may concern:*

Be it known that I, RASMUS H. MADSEN, a citizen of the United States, residing at Los Angeles, in the county of Los Angeles and State of California, have invented new and useful Improvements in Lawn-Mower Grinders, of which the following is a specification.

This invention is a lawn mower grinder forming improvements in the construction covered by my Patent No. 1,291,982, granted January 21, 1919 for lawn mower grinders.

It is the object of the present invention to provide means for adjusting the guide plate engaging the rotary blades of the lawn mower so that blades of different width may be engaged by the guide plate.

It is a further object of the invention to provide means for adjusting said guide plate relative to the grinding wheel in order that the rotary blades may be properly positioned for obtaining the proper beveled cutting edge upon said blades.

It is a still further object of the invention to provide an improved mounting for the guide plate supporting the stationary blade of the lawn mower, said mounting consisting of a main supporting screw for the entire guide plate and an auxiliary adjusting screw for adjusting the movable member of said guide plate.

The invention will be readily understood from the following description of the accompanying drawings, in which—

Figure 1 is a side elevation of the improved grinder and showing a portion of a lawn mower in vertical section with a rotary blade thereof in position to be ground.

Fig. 2 is a top plan view of the improved grinder.

Fig. 3 is a detail horizontal section on the line 3—3 of Fig. 1.

In the drawings I have shown a portion of a usual lawn mower having the wheels 1, shaft 2 for the rotary blades 3, and fixed blade 4, all of any usual or preferred construction.

As in my aforementioned patent the grinder consists essentially of a main bar 5, adapted to be supported at right angles to shaft 2, and carrying a rotatable grinding wheel 6. This bar is provided with means for engaging either the fixed or one of the rotary blades of the mower, at the end of said bar carrying the grinding wheel, so that said blade will be held in engagement against the grinding wheel. The bar is also provided with means at its opposite end for engaging the main brace rod of the mower, and is also provided at said end with means, such as clearly shown and described in my aforementioned patent, for rotating the shaft 7 journaled along side bar 5, and at the same time shifting the apparatus transversely along the length of the blades.

The grinding wheel 6 is journaled beyond bar 5 and in alinement therewith as by mounting said wheel upon a transverse shaft 9. This shaft may be journaled in a fixed bearing plate 8 extending beyond the end of bar 5 at one side thereof, and in a second bearing plate 10 extending beyond the opposite side of bar 5. A bevel gear connection 11—12 is provided between shafts 9 and 7 for causing rotation of shaft 7 to turn the grinding wheel.

A supporting plate 14 extends beyond the grinding wheel and is, preferably, adjustably mounted relative to the same. As an instance of this arrangement the supporting plate may be connected at one side to the bearing plate 10 which is in turn adjustably connected to bar 5 by means of screw 15 received in slot 16 in said bearing plate. At the other side, the supporting plate is shown as connected to a plate 17 which is adjustably connected to bearing plate 8 as by the screw and slot connection 18—19. The bearing for shaft 9 formed in plate 10 is, preferably, an elongated bearing, so that the supporting plate, with plates 10 and 17, may be adjusted toward and away from the grinding wheel.

The guide plate for the stationary blade of the lawn mower depends from supporting plate 14. This guide plate is shown as comprising a cross head 21 having the upwardly extending guides 22 slidably received in sleeves 23 upon supporting plate 14. An arm 24 extends downwardly from the side of the cross head adjacent wheel 6, and a finger 25 extends backwardly from the lower end of arm 24 to engage under the stationary blade 4 of the lawn mower.

A plate 26 extends parallel to finger 25 and is adapted to impinge against the top of blade 4. The ends of plate 26, preferably, overlie the sides of arm 24 as shown at 27 in order to guide said plate relatively to finger 25. The plate is, preferably, adjusted toward and away from finger 25 by means of an adjusting screw 28 extending upwardly from the plate through a threaded sleeve 29 upon cross head 21, with a coil spring 30 interposed between said cross head and the plate.

The upper end of screw 28, preferably, extends through supporting plate 14 and is provided with a suitable thumb nut 32 for turning the same to adjust the distance between plate 26 and finger 25, so that blades of varying thickness may be held by the guide plate.

When the rotary blades of the lawn mower are being sharpened, the wheel 6 is raised relative to the entire guide plate for the stationary blade, to the position shown in Fig. 1, for supporting the wheel 6 out of engagement with the stationary blade. When, however, the stationary blade is to be sharpened the wheel 6 is elevated relative to the guide plate to bring the grinding wheel into contact with said blade.

The means employed for thus shifting the guide plate may consist of a screw rod 34 extending upwardly from cross head 21 through a split clamping screw threaded sleeve 35 upon supporting plate 14. The clamping sleeve may be provided with a clamp screw 36 for tightening the same and thus holding screw rod 34 and the guide plate in adjusted positions.

A slot 38 is formed through the arm 24 so that the edge of the grinder 6 will extend through the slot and grind the edge of the fixed blade 4 as the grinder moves laterally along the same.

An adjustable guide plate 40 is arranged to engage the respective rotary blades 3 for retaining the latter in position to be ground. This guide plate is provided with a slot 41 intermediate of its ends through which is received a screw 42 threaded into the plate 17. The guide plate is thus arranged to be longitudinally adjusted so as to move the lower end thereof toward and away from the grinding wheel 6 for positioning the rotary blade engaged thereby in adjusted positions relative to the grinder wheel.

The lower end of the guide plate 40 consists of a fixed finger 43 arranged to impinge against one side of a rotary blade 3 and a pivoted finger 44 arranged to abut against the opposite side of the rotary blade. The finger 44 may be swung toward and away from finger 43 in order to engage blades of varying thickness by mounting the finger 44 upon a pivot bolt 45 extending through the guide plate 40. A screw rod 46 is rotatably connected to the fixed finger 43 as by means of the bearing bracket 47, and said screw rod is threaded through a bearing bracket 48 upon the pivoted finger 44 so that rotation of said screw rod by grasping the thumb nut 49 provided thereon will move the pivoted finger with relation to the fixed finger.

In addition to the longitudinal adjustment of guide plate 40 provided by screw 42 movable in slot 41, said guide plate is also arranged for adjusted pivotal movement upon the screw 42 in order to present the edge of the rotary blade engaged by the guide plate at the desired angle to the grinder wheel 6. As an instance of this arrangement a screw rod 50 extends laterally from the upper end of guide plate 40 and is provided with a thumb screw 51 held against longitudinal movement relative to the screw rod between suitable brackets 52 mounted upon bar 5 and positioned at the opposite faces of the thumb nut. It will thus be seen that when screw 42 is loosened the guide plate 40 may be accurately pivotally adjusted upon said screw by rotating the thumb nut 51 so as to draw the screw rod 50 through said thumb nut.

Various changes may be made without departing from the spirit of the invention as claimed.

What is claimed is:

1. In a lawn mower grinder having a supporting frame secured to a lawn mower and a grinding wheel carried thereby, a guide plate arranged to engage a blade of the lawn mower, and an operating connection for pivotally and longitudinally adjusting said guide plate.

2. In a lawn mower grinder having a supporting frame secured to a lawn mower and a grinding wheel carried thereby, a guide plate arranged to engage a blade of the lawn mower, said guide plate including a fixed finger and a pivotally adjustable finger, said fingers being arranged to engage the respective sides of said blade.

3. In a lawn mower grinder having a supporting frame secured to a lawn mower and a grinding wheel carried thereby, a guide plate arranged to engage a blade of the lawn mower, said guide plate including a fixed finger and a pivotally adjustable finger arranged to engage the respective sides of said blade, and an operating connection for pivotally and longitudinally adjusting said guide plate.

4. In a lawn mower grinder having a supporting frame secured to a lawn mower and a grinding wheel carried thereby, a guide plate arranged to engage a rotary blade of the lawn mower, means for adjusting said guide plate relative to said grinding wheel, said guide plate including a fixed finger arranged to engage the under side of a rotary blade, and an adjustable plate movable toward and away from said fixed finger for engaging the upper side of said rotary blade.

5. In a lawn mower grinder having a supporting frame secured to a lawn mower and a grinding wheel carried thereby, a guide plate arranged to engage a rotary blade of the lawn mower, means for adjusting said guide plate relative to said grinding wheel, said guide plate including a fixed finger arranged to engage the under side of a rotary blade, an adjustable plate movable toward and away from said fixed finger for engaging the upper side of said rotary blade, a guide plate arranged to engage the stationary blade of the lawn mower, and actuating means for pivotally adjusting said guide plate.

6. In a lawn mower grinder having a supporting frame secured to a lawn mower and a grinding wheel carried thereby, a guide plate arranged to engage a rotary blade of the lawn mower, means for adjusting said guide plate relative to said grinding wheel, said guide plate including a fixed finger arranged to engage the under side of a rotary blade, an adjustable plate movable toward and away from said fixed finger for engaging the upper side of said rotary blade, a guide plate arranged to engage the stationary blade of the lawn mower, said guide plate including a fixed finger and a pivotally adjustable finger arranged to engage the respective sides of said stationary blade, and actuating means for pivotally adjusting said guide plate.

In testimony whereof I have signed my name to this specification.

RASMUS H. MADSEN.